United States Patent
Cheng et al.

(10) Patent No.: US 10,618,350 B2
(45) Date of Patent: Apr. 14, 2020

(54) CONNECTING STRUCTURE MOUNTING WHEEL TO HALF SHAFT

(71) Applicant: Zhejiang CFMOTO Power Co., Ltd., Hangzhou, Zhejiang (CN)

(72) Inventors: Fuying Cheng, Hangzhou (CN); Zhenxiang Kuang, Hangzhou (CN)

(73) Assignee: Zhejiang CFMOTO Power Co., Ltd., Hangzhou (CN)

( * ) Notice: Subject to any disclaimer, the term of this patent is extended or adjusted under 35 U.S.C. 154(b) by 251 days.

(21) Appl. No.: 15/617,207

(22) Filed: Jun. 8, 2017

(65) Prior Publication Data
US 2017/0355226 A1  Dec. 14, 2017

(30) Foreign Application Priority Data

Jun. 8, 2016  (CN) ..................... 2016 2 0556079 U (51) Int. Cl.
*B60B 27/00* (2006.01)
*F16D 1/108* (2006.01)
(Continued)

(52) U.S. Cl.
CPC ........ *B60B 27/0026* (2013.01); *B60B 27/065* (2013.01); *B60B 35/14* (2013.01);
(Continued)

(58) Field of Classification Search
CPC .. F16B 7/0413; F16B 2001/103; F16B 1/108; F16B 1/06; F16B 1/10; B60B 3/142;
(Continued)

(56) References Cited

U.S. PATENT DOCUMENTS 2,235,457 A * 3/1941 Lorimor .............. B60B 27/0026
180/906
2,271,849 A * 2/1942 Wallace ............... B60K 17/306
180/254
(Continued)

FOREIGN PATENT DOCUMENTS

KR        20130126414 A * 11/2013 ............... F16D 1/06

OTHER PUBLICATIONS

Machine translation of KR20130126414A, Nov. 20, 2013, pp. 5 (Year: 2013).*

*Primary Examiner* — Jason R Bellinger
(74) *Attorney, Agent, or Firm* — Shewchuk IP Services, LLC; Jeffrey D. Shewchuk (57) ABSTRACT

A half shaft connects to the mounting bracket of the wheel in a splined connection. The straight external spline of the half shaft is modified to a helical or involute external spline, in which the helix angle adopted is small. The mounting bracket of the wheel can be longitudinally advanced by hand assembly only part way onto the half shaft. The rest of the longitudinal advancement during assembly occurs by tightening the nut to completely eliminate the fit clearance between the external spline and its corresponding mating arrangement. Various road tests of vehicles verify that, when using the present invention, the nut does not loosen during use of the vehicle. The invention enables the locking force of the nut to be reduced, and assembly and maintenance are convenient.

19 Claims, 4 Drawing Sheets

(51) Int. Cl.
*B60B 27/06* (2006.01)
*B60B 35/14* (2006.01)
*F16D 3/223* (2011.01)
*F16D 1/10* (2006.01)

(52) U.S. Cl.
CPC .......... *F16D 1/108* (2013.01); *B60B 2320/10* (2013.01); *F16D 3/223* (2013.01); *F16D 2001/103* (2013.01); *F16D 2003/22326* (2013.01)

(58) Field of Classification Search
CPC . B60B 27/00; B60B 27/0015; B60B 27/0021; B60B 27/0026
See application file for complete search history.

(56) References Cited

U.S. PATENT DOCUMENTS

| | | | | |
|---|---|---|---|---|
| 4,292,001 | A * | 9/1981 | Snell | F01D 5/025 403/298 |
| 4,395,247 | A * | 7/1983 | Roberts | F01D 5/026 403/359.6 |
| 4,615,422 | A * | 10/1986 | Thebert | F16D 23/04 192/108 |
| 5,533,825 | A * | 7/1996 | Stone | F01D 5/026 403/359.6 |
| 6,485,188 | B1 * | 11/2002 | Dougherty | B60B 27/00 384/589 |
| 7,802,363 | B2 * | 9/2010 | Sakamoto | B60B 27/00 29/894 |
| 8,256,968 | B2 * | 9/2012 | Kapaan | B60B 7/0013 301/105.1 |
| 9,039,286 | B2 * | 5/2015 | Torii | B60B 27/0005 384/544 |

* cited by examiner

CONNECTING STRUCTURE MOUNTING WHEEL TO HALF SHAFT

CROSS-REFERENCE TO RELATED U.S. APPLICATION(S)

None.

FIELD OF THE INVENTION

The present invention relates to the field of wheeled land vehicles, and particularly to a type of connecting structure mounting the wheel to its half shaft.

BACKGROUND OF THE INVENTION

In existing wheeled land vehicles, wheels are supported for rotation by a half shaft which rotates about its axis to provide torque to the wheel. For ease of assembly, repair itself, the wheel typically includes a mounting bracket, and the half shaft is connected to the mounting bracket of the wheel has an internal spline which mates with an external spline on the half shaft. While the mating spline may involve a single longitudinally extending ridge in a corresponding recess, more commonly there are numerous longitudinally extending ridges that mate into corresponding recesses. On the half shaft, the spline is located slightly inward from the end of the half shaft, and the end of the half shaft includes a standard male thread similar to a bolt. The mounting bracket of the wheel is then secured to its half shaft by a threaded locking nut rotationally secured onto the male thread of the half shaft. When assembled; the drive force of the half shaft is transmitted to the wheel by the internal spline and the external spline, enabling the wheel to work as intended.

In order to enable assembly, there must be some fit clearance between the external and internal splines. At the same time, during use it is desired to minimize any play between the wheel mounting bracket and its half shaft. Manufacturing tolerance on the two mating splines are accordingly quite tight and precise, increasing cost to the manufacturing process.

Even with highly accurate manufacturing and tight tolerances, the clearance required for assembly can result in slight movement between the internal spline and the external spline at times of high acceleration or deceleration or when the vehicle is impacted. As a result of this slight back-and-forth movement of the internal spline and the external spline, there are times when the locking nut may slowly loosen. Eventually, the loosened locking nut could lead to unsafe conditions. Ways to prevent loosening of the locking nut are needed, while still permitting ease of initial assembly and repair when needed, and without adding significant cost to the vehicle.

BRIEF SUMMARY OF THE INVENTION

The present invention involves a mounting structure for a wheel of a land vehicle which is mounted on a half shaft. The half shaft has at least one external or internal spline and has a threaded end beyond the spline. The spline has a curvature which differs from a curvature (which can be linear) of the mating arrangement on the wheel mounting bracket, such that longitudinal advancement of the mounting bracket onto the half shaft takes up the clearance between the spline and the mating arrangement and imparts a torsional static binding force between the half shaft and the wheel mounting bracket. A nut threading attaches to the threaded end of the half shaft for securing the wheel mounting bracket to the half shaft. Various road tests of vehicles verify that, when using the present invention, the nut does not loosen during use of the vehicle. The invention enables the locking force of the nut to be reduced, and assembly and maintenance are convenient.

In these Figures, the designation "p" indicates reference to the prior art version of the structure when different from the inventive structure, and reference numerals are as follows:

1, 1p indicates the half shaft;
2 indicates the shaft supporting base;
3 indicates the mounting bracket of the wheel;
4 indicates the wheel;
5 indicates the nut;
6 indicates the split pin;
7 indicates the tire;
8 indicates the hole for the split pin
11, 11p indicates the helical external spline teeth;
12, 12p indicates the half shaft spline arrangement;
13 indicates the half shaft axis;
14 indicates the threads on the end of the half shaft;
31 indicates the straight internal spline recesses; and
32 indicates the mounting bracket spline arrangement.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
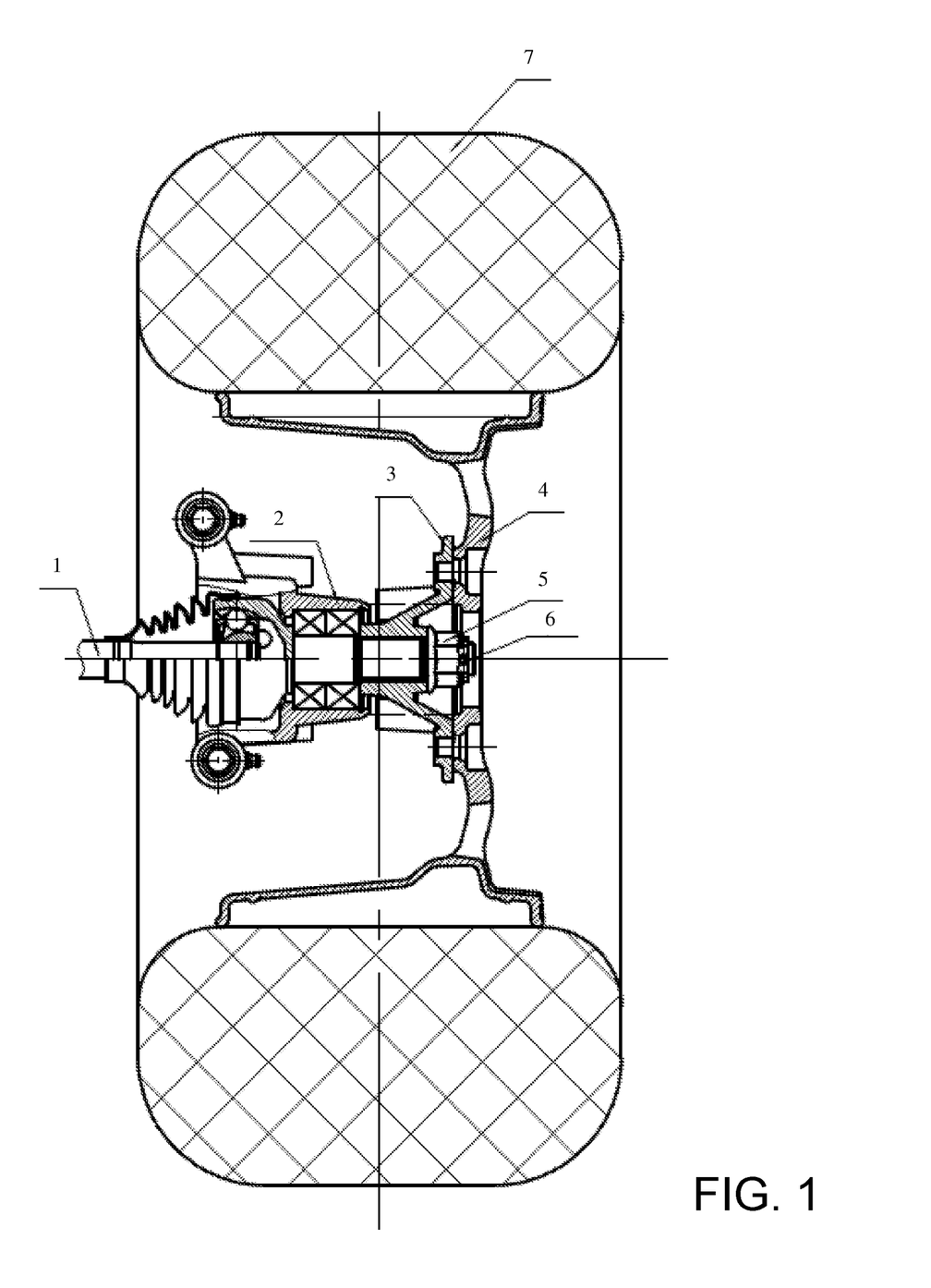
FIG. 1 is an assembled side view, with a portion shown in cross-section, showing the connecting structure provided by the preferred embodiment of the present invention.

The present invention is directed at the structure for mounting a wheel of a land vehicle such as an automobile or all-terrain vehicle. As shown in FIG. 1, the wheel 4 supports a tire 7 and is mounted from a mounting bracket 3 as well known in the art. A half shaft 1 driving the wheel extends through a supporting base 2. Rotation of the half shaft 1 drives the wheel to propel the vehicle, although the invention could alternatively be used with undriven half shafts.

Figure 2:
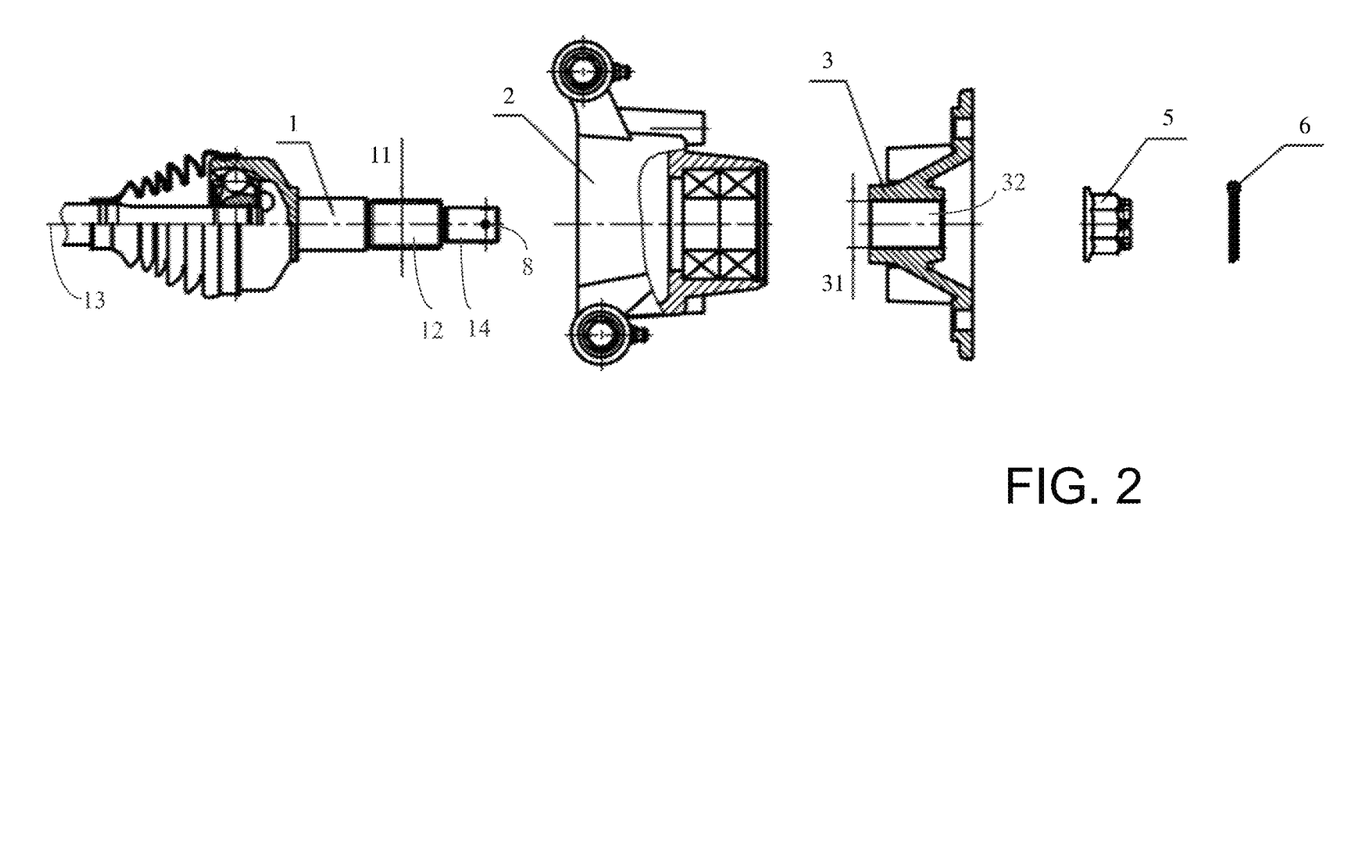
FIG. 2 is an exploded side view, with the mounting bracket and portions of the half shaft and shaft supporting base shown in cross-section, showing the connecting structure provided by the preferred embodiment of the present invention.

In the preferred embodiment, the mounting bracket 3 of the wheel is identical to prior art mounting brackets. In this particular example, the mounting bracket 3 includes an internal spline arrangement 32 as known in the prior art. For instance, the internal spline of the mounting bracket 3 may consist of twenty-seven tooth recesses 31 that run longitudinally, i.e., each tooth recess 31 runs parallel to the axis defined by the aperture for the half shaft 1. Moreover, in that FIGS. 1 and 2 do not provide sufficient detail to show the spline arrangement on the half shaft 1, FIGS. 1 and 2 are equally applicable to the prior art as well as to the present invention.

Figure 3:
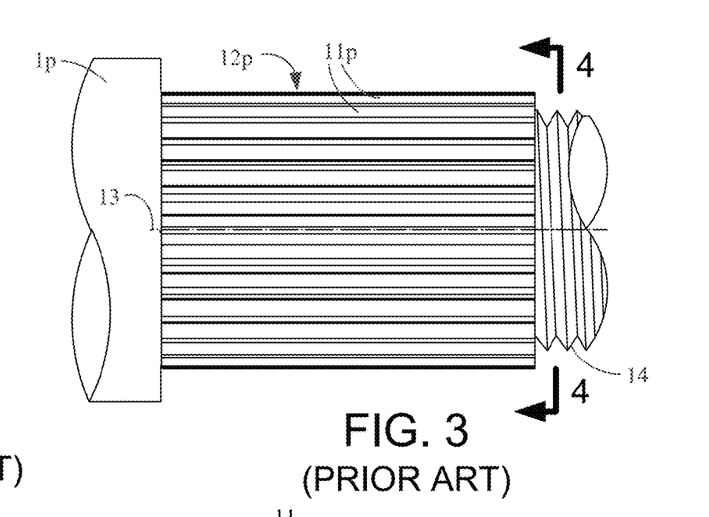
FIG. 3 is a side view of the prior art splined end of the half shaft.
Figure 4:
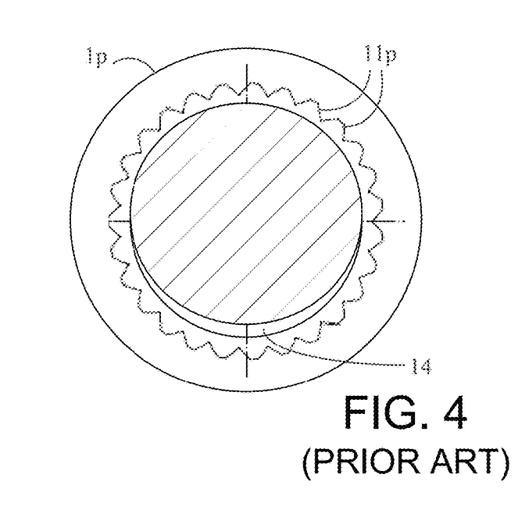
FIG. 4 is a cross-sectional view of FIG. 3, taken along line 4-4 through the threaded end of the half shaft and looking endwise at the spline of the prior art.
Figure 5:
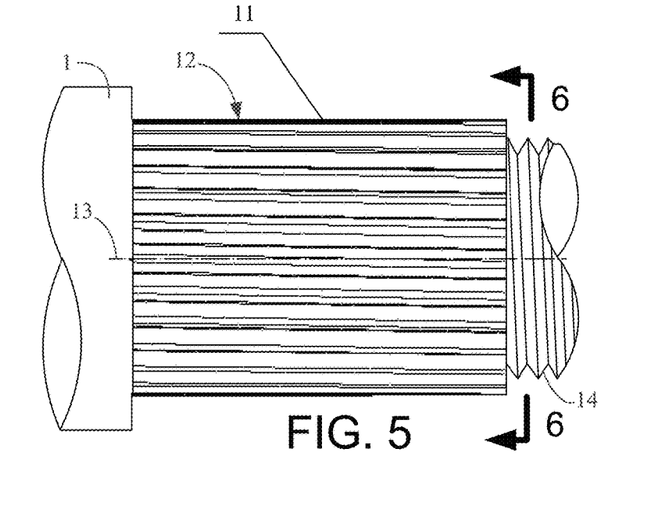
FIG. 5 is a side view of the helical splined end of the half shaft of the present invention.
Figure 6:
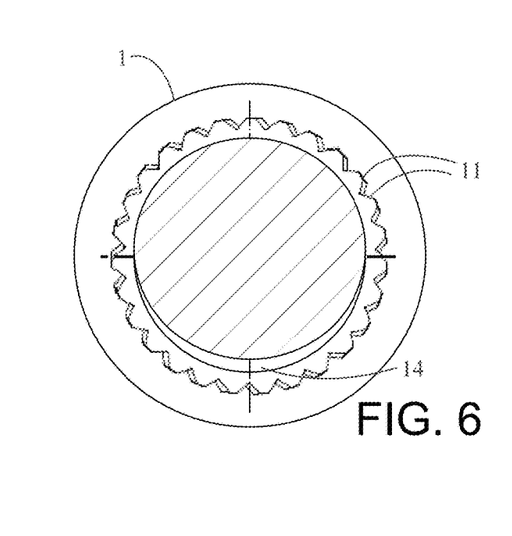
FIG. 6 is a cross-sectional view of FIG. 5, taken along line 6-6 through the threaded end of the half shaft and looking endwise at the helical spline of the preferred embodiment of the present invention.

FIGS. 3-6 show more detail of the spline arrangement, both of the prior art (FIGS. 3 and 4) and in the present invention (FIGS. 5 and 6). As shown in FIGS. 3 and 4, prior art half shafts 1p included the corresponding external spline structure 12p to mate with the internal spline arrangement 32 of the mounting bracket 3. In this particular example, the half shaft spline arrangement 12p includes twenty-seven teeth 11p running longitudinally, each in a line parallel to the axis 13 defined by the half shaft 1p. The teeth 11p should be of sufficient size to transfer torque, such as having a difference between major and minor diameters in the range of 0.2 to 5 mm. In this particular example, the half shaft spline arrangement 12p has a reference diameter of 27 mm, with a maximum minor diameter of 26 mm and a major diameter of 28 mm with a major diameter tolerance of +0 mm and −0.21 mm. The spline teeth 11p run for a significant interaction length on the half shaft 1p, such as having a spline tooth section 12p which is over 20 mm in length, and more preferably about 38 mm long.

During assembly of the mounting bracket 3 onto the half shaft 1p, the mounting bracket 3 is positioned so as to align the twenty-seven teeth 11p of the external spline 12p of the half shaft 1p with the twenty-seven recesses 31 of the mounting bracket 3 and then longitudinally advanced onto the half shaft 1p. In order to ensure that the mounting bracket 3 can be advanced longitudinally onto the half shaft 1p during assembly, a designed clearance between the twenty-seven teeth 11 and the twenty-seven recesses 31 is necessary, i.e., each tooth 11p is designed to be slightly smaller, both in diameter from the half shaft axis 13 and in the size of the tooth 11p, relative to its corresponding recess 31. Further, manufacturing tolerances on both the half shaft 1p and the mounting bracket 3 could lead to greater amounts of clearance. For example, a tooth profile tolerance of 0.02 mm and a tooth lead tolerance of 0.02 mm might be applicable.

During assembly of the prior art unit, a nut 5 was then threaded onto the threads 14 on the end of the half shaft 1p to hold the mounting bracket 3 onto the half shaft 1p. The mating spline arrangement 12p, 32 between the half shaft 1p and the mounting bracket 3 transfers torque, so when the half shaft 1p rotates, the mounting bracket 3 and wheel 4 also rotates. In the prior art best shown in FIG. 4 and in the preferred embodiment best shown in FIG. 6, the pressure angle between the external teeth 11p, 11 and the internal teeth 31 is 45°.

In the preferred embodiment of the present invention shown in FIGS. 5 and 6, which is designed for use with the identical mounting bracket 3 of the prior art, the external teeth 11 of the half shaft 1 are accordingly similar to the prior art external teeth 11p in several ways: the teeth 11 have a reference diameter of 27 mm, a maximum minor diameter of 26 mm, a major diameter of 28 mm with a major diameter tolerance of +0 mm and −0.21 mm, a pressure angle of 45°, a tooth profile tolerance of 0.02 mm and a tooth lead tolerance of 0.02 mm. The present invention is equally applicable to other values of each of these parameters. While the preferred embodiment considers teeth 11 on the half shaft 1, other embodiments use one or more recesses on the half shaft which mate with one or more teeth on the mounting bracket.

However, unlike the linear external teeth 11p of the prior art, the half shaft spline teeth 11 of the present invention are not linear but instead have a slight helical angle about the axis 13 defined by the half shaft 1. The amount of the helical angle is chosen to produce a desired spring tightening/binding force between the corresponding spline teeth 11 and recesses 31, and thus the amount of the helical angle depends significantly on the length of the internal spline teeth 11 on the mounting bracket 3. The helix angle is also determined somewhat based on the tolerance grade of the internal spline recesses 31 and the external spline teeth 11. In this preferred example with the spline tooth section 11 being about 38 mm long and with no helix angle on the interior teeth 31 of the mounting bracket 3, the helical angle should be less than 1°, and more preferably less than 0°20′, such as in the range of 0°15′–0°20′. In the most preferred embodiment, the helical angle of the external spline teeth 11 is 0°18′+3′. This helical angle of the external spline teeth 11 is difficult to identify in the side view of FIG. 5, but can be slightly seen in the end view of FIG. 6 because the teeth 11 do not exactly line up between the two ends. Compare FIG. 6 to FIG. 4.

In the preferred embodiment, the helical angle of the external spline teeth 11 is in the right-hand direction, which further helps in maintaining tightness of the mounting bracket 3 to the half shaft 1 after assembly. However, a left hand helical angle could alternatively be used, as the most important aspect for maintaining tightness is the difference between the helical angle of the external spline teeth 11 relative to the helical angle of the spline recesses 31 on the mounting bracket 3. (In the preferred embodiment, the helical angle of the spline recesses 31 is 0°).

Figure 7A:
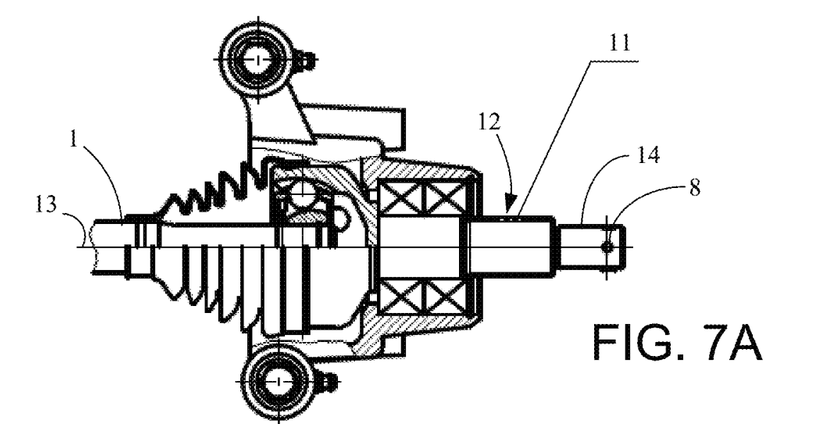
FIGS. 7A, 7B and 7C are side views of the assembly sequence showing the connecting structure provided by the preferred embodiment of the present invention.
Figure 7B:
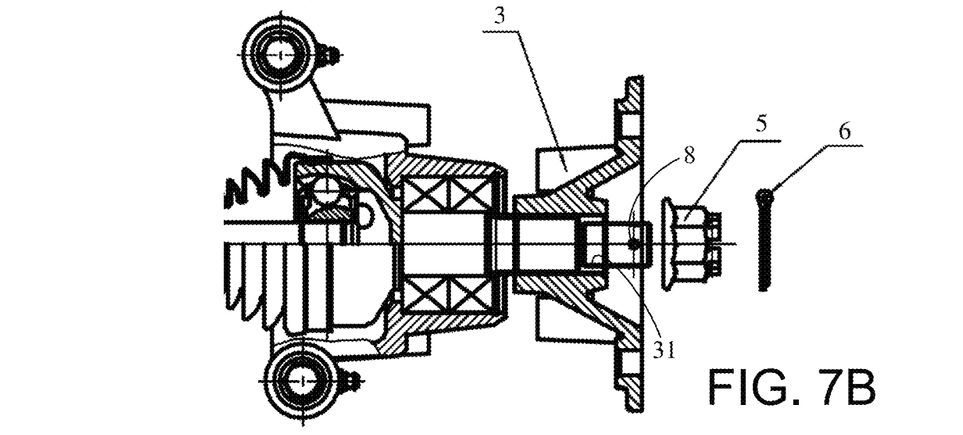
Figure 7C:
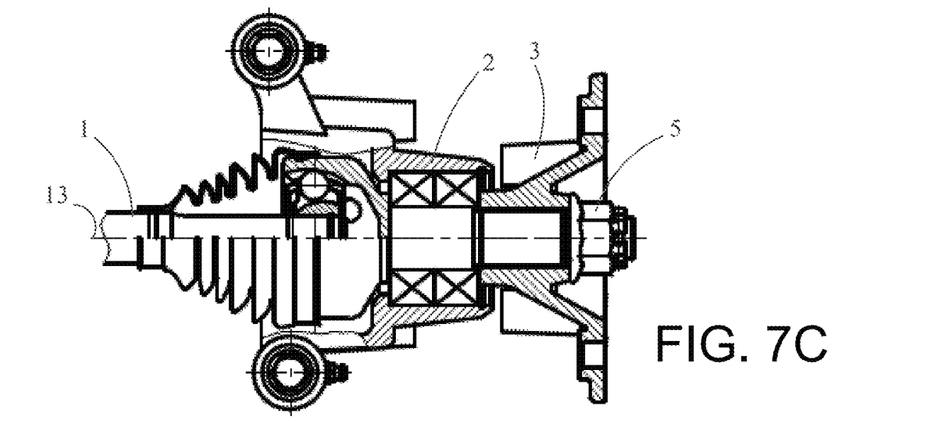

The assembly method of the present invention is shown in FIGS. 7A-7C. The half shaft 1 passes through the mounting hole of the shaft supporting base 2 as shown in FIG. 7A. The mounting bracket 3 of the wheel is placed onto the end of the half shaft 1. Because the internal recesses 31 and external spline teeth 11 have the same clearance as in the prior art, this initial placement of the mounting bracket 3 is easy just by aligning the external teeth 11 with the internal recesses 31. However, as the mounting bracket 3 is longitudinally advanced (to the left in FIG. 7B), the difference in the helical angle of the external spline teeth 11 relative to the straight internal recesses 31 eats up the initial clearance. Typically, when the recesses 31 are half or two thirds of the way onto the external teeth 11, the clearance is fully consumed by the helical angle difference, and the teeth begin to bind, preventing further longitudinal advancement by hand. The nut 5 is then tightened and torqued onto the threads 14 of the half shaft 1, further pushing the mounting bracket 3 to the left and tightening the bind between the external spline teeth 11 and the internal recesses 31 to the position shown in FIG. 7C. Preferably, the outside end face of the mounting hole of the wheel mounting bracket 3 is a ring, easy to match with the end face of the nut 5. After the nut 5 has been fully torqued and the assembly is tight, a split pin 6 or similar interference member can be employed such as into a hole 8 on the end of the half shaft 1 to further ensure that no loosening of the nut 5 occurs.

Workers skilled in the art will appreciate that the helical angle of the spline teeth 11 contributes only slightly to maintaining tightness, and it is the difference in helical angles between the spline teeth 11 and the spline recesses 31 which provides the primary benefit. Essentially the same benefit could be achieved if the spline teeth had a helical angle of 0°0' and the spline recesses had a helical angle of 0°18'. As another example, essentially the same benefit could be achieved if the spline teeth had a helical angle of 5°18' and the spline recesses had a helical angle of 5°. In all these examples, the important aspect is that the difference in helical angles causes the spline teeth 11 to take up the clearance with the spline recesses 31 as the mounting bracket 3 is longitudinally advanced on the half shaft 1, to the point of binding when being held in place by the torqued nut 5.

Further, the present application refers to helical angles because, in the preferred embodiments, the helical angle is consistent along the length of the spline teeth 11 and along the length of the spline recesses 31. Other embodiments include a curvature which changes along the length of the spline teeth 11 and/or spline recesses 31. For instance, the spline teeth 11 can be linear with a 0° helical angle along the outer 19 mm of its length, and then proceed with a helical angle of 0°36' along the inner 19 mm of its length, thereby achieving substantially the same result but allowing a greater longitudinal advancement of the mounting bracket onto the half shaft 1 before the initial binding begins. Another embodiment includes a spline tooth helical angle that begins at 0°0' and gradually increases as it moves inward on the half shaft 1. The key aspect is the difference in curvature in the longitudinal direction of the teeth 11 relative to their recesses 31, such that a complete longitudinal advancement of the mounting bracket 3 onto the half shaft 1 first takes up the clearance between the teeth 11 and their recesses 31 and then results in a static torsional stress imparted between the teeth 11 and their recesses 31 to prevent any loosening during use.

As a result of the curvature/helical angle difference, the present invention appears to have completely solved the prior art problem created by the fit clearance. In various road tests of vehicles testing, the locking nut 5 does a much better job of maintaining its tightness. The present invention thus eliminates the potential safety hazard of the prior art. Additionally, the present invention has been found to enable the locking force of the nut 5 to be reduced, making initial assembly more convenient and making maintenance easier when the locking nut 5 has to be removed. In general, while intentional loosening of the locking nut 5 can be made easier by the present invention, the binding created by the curvature/helical angle disparity may require several blows to the mounting bracket 3 after the locking nut 5 has been removed to overcome the binding and enable the mounting bracket 3 to be pulled longitudinally off the half shaft 1.

Although the present invention has been described with reference to preferred embodiments, workers skilled in the art will recognize that changes may be made in form and detail without departing from the spirit and scope of the invention.

The invention claimed is:

1. A mounting structure for a land vehicle wheel, comprising:
    a half shaft, the half shaft having at least one spline tooth and having a threaded end immediately beyond the spline tooth, the spline tooth having a spline tooth length; and
    a wheel mounting bracket engaged to the half shaft having at least one spline recess that receives the spline tooth in a mating arrangement such that the spline tooth permits a transfer of torque between the half shaft and the wheel mounting bracket, the spline recess having a clearance relative to the mating spline tooth, the spline recess having a spline recess length; and
    a nut threadingly attached to the threaded end of the half shaft for securing the wheel mounting bracket to the half shaft;
    wherein the at least one spline tooth has a first constant helical angle over at least a portion of the spline tooth length, and wherein the at least one spline recess has a second constant helical angle over a mating portion of the spline recess length, with the first constant helical angle being different from the second constant helical angle, such that axial assembly of the wheel mounting bracket onto the half shaft including an axial force provided by tightening of the nut thereby imparts a torsional static binding force between the half shaft and the wheel mounting bracket which takes up the clearance between the at least one spline tooth and the at least one mating spline recess.

2. The mounting structure of claim 1, wherein the half shaft has a plurality of external spline teeth received in corresponding internal spline recesses of the mounting bracket.

3. The mounting structure of claim 1, wherein the second constant helical angle is a 0° helical angle.

4. The mounting structure of claim 1, wherein the first constant helical angle is greater than 0° and less than 1°.

5. The mounting structure of claim 4, wherein the first constant helical angle of the at least one spline tooth is less than 0°20'.

6. The mounting structure of claim 5, wherein the first constant helical angle of the at least one spline tooth is in the range of 0°15'–0°20'.

7. The mounting structure of claim 4, wherein a longitudinal length of the significant portion of the at least one spline tooth having the first constant helical angle is at least 20 mm.

8. The mounting structure of claim 2, wherein the plurality of external spline teeth have a difference between major and minor diameters in the range of 0.2 to 5 mm.

9. The mounting structure of claim 1, wherein the first constant helical angle differs from the second constant helical angle by an amount greater than 0° and less than 1°.

10. The mounting structure of claim 1, further comprising a split pin extending through a hole on the threaded end of the half shaft beyond the nut.

11. The mounting structure of claim 1, further comprising:
    a wheel secured to the wheel mounting bracket; and
    a tire supported on the wheel.

12. A method for assembling a wheel mounting bracket to a half shaft of a wheeled land vehicle, comprising:
    aligning a wheel mounting bracket relative to a half shaft such that at least one spline tooth on the half shaft lines up with a mating at least one spline recess on the wheel mounting bracket, the at least one spline tooth having a spline tooth length and the mating at least one spline recess having a spline recess length, the at least one spline tooth and the mating at least one spline recess having a clearance, the at least one spline tooth having a first constant helical angle over at least a portion of the spline tooth length, the at least one spline recess having a second constant helical angle over a mating portion of the spline recess length, with the first constant helical angle being different from the second constant helical angle, the half shaft having a threaded end beyond the at least one spline tooth;

longitudinally advancing the wheel mounting bracket onto the half shaft, thereby taking the clearance between the at least one spline tooth and the mating at least one spline recess until binding occurs due to the difference between the first constant helical angle and the second constant helical angle;

threading a nut onto the threaded end of the half shaft until the nut contacts the mounting bracket; and torquing the nut to longitudinally advance the wheel mounting bracket further onto the half shaft, thereby imparting a torsional static binding force between the half shaft and the wheel mounting bracket.

13. The method of claim 12, wherein an amount of longitudinal advancing of the wheel mounting bracket onto the half shaft is half to two thirds of a longitudinal length of the at least one spline tooth prior to binding and prior to contact by the nut.

14. The method of claim 13, wherein the longitudinal length of the portion of the at least one spline tooth having the first constant helical angle is at least 20 mm.

15. The method of claim 12, wherein the half shaft has a plurality of external spline teeth received in corresponding internal spline recesses of the mounting bracket, and wherein a difference between major and minor diameters of the plurality of external spline teeth is in the range of 0.2 to 5 mm.

16. The method of claim 12, wherein the second constant helical angle is 0°, and wherein the first constant helical angle is in the range of 0°15'–0°20'.

17. The method of claim 12, further comprising inserting a split pin into a hole on an end of the half shaft after the nut has been torqued.

18. The mounting structure of claim 1, wherein the wheel mounting bracket extends axially relative to the half shaft, in a direction off the end of the half shaft, to a location which is beyond a surface of the nut that contacts the wheel mounting bracket.

19. The method of claim 12, wherein the wheel mounting bracket extends axially relative to the half shaft, in a direction off the end of the half shaft, to a location which is beyond a surface of the nut that contacts the wheel mounting bracket.

* * * * *

UNITED STATES PATENT AND TRADEMARK OFFICE
CERTIFICATE OF CORRECTION

PATENT NO. : 10,618,350 B2
APPLICATION NO. : 15/617207
DATED : April 14, 2020
INVENTOR(S) : Fuying Cheng et al.

It is certified that error appears in the above-identified patent and that said Letters Patent is hereby corrected as shown below:

In the Claims

In Claim 7, at Column 6, Line 38, delete "significant".

Signed and Sealed this
Sixteenth Day of June, 2020

Andrei Iancu
*Director of the United States Patent and Trademark Office*